United States Patent [19]

David

[11] Patent Number: 5,282,405
[45] Date of Patent: Feb. 1, 1994

[54] DRUM PUNCHING SHEARS

[75] Inventor: Siegfried David, Hilchenbach, Fed. Rep. of Germany

[73] Assignee: SMS Schloemann-Siemag Aktiengesellschaft, Dusseldorf, Fed. Rep. of Germany

[21] Appl. No.: 870,956

[22] Filed: Apr. 20, 1992

[30] Foreign Application Priority Data

Apr. 20, 1991 [DE]  Fed. Rep. of Germany ....... 4112953

[51] Int. Cl.$^5$ ............................................. B23D 25/12
[52] U.S. Cl. ........................................ 83/105; 83/443; 83/592
[58] Field of Search ................ 83/105, 106, 592, 675, 83/403, 441, 443, 670, 484, 485, 488, 907, 913, 950, 669; 140/140

[56] References Cited

U.S. PATENT DOCUMENTS

| | | | |
|---|---|---|---|
| 2,414,772 | 1/1947 | Sheperdson | 83/106 |
| 4,063,481 | 12/1977 | Roudys et al. | 83/441 X |
| 4,537,107 | 8/1985 | Armstrong et al. | 83/913 X |

FOREIGN PATENT DOCUMENTS

0259600 8/1987 European Pat. Off. .

*Primary Examiner*—Frank T. Yost
*Assistant Examiner*—Rinaldi Rada
*Attorney, Agent, or Firm*—Anderson Kill Olick & Oshinsky

[57] ABSTRACT

A rotating cropping and sampling shear for rapidly running rolling stock, particularly for wire and/or bar steel is disclosed. The shear has a blade support rotatable in a shear housing and is constructed in a hollow-cylindrical manner. The shear has a ring blade whose cutting edge rotates at the hollow-cylindrical wall of the blade support, a blade drum which is axially spaced from the blade support and is rotatable in the same rotational plane and includes a ring blade arranged at the outer circumference whose cutting edge runs along the outer wall of the drum. The rolling stock is guided in the space between the blade support and the blade drum. The blade support or the blade drum can be displaced axially relative to one another and one inside the other by a displacing device.

15 Claims, 8 Drawing Sheets

DRUM PUNCHING SHEARS

FIELD OF THE INVENTION

The invention is directed to rotating cropping and sampling shears for rolling stock, particularly for wire and/or bar steel rolling mill trains with high rolling speeds for the wire or bar steel.

BACKGROUND OF THE INVENTION

Because of the production methods for hot-rolled, slender rolling stock, such as wire rod or bar steel, inherent dimensional defects and other defective locations occur, particularly in the leading ends or lagging ends of the rolling stock. Accordingly, it is necessary to remove the defective end pieces between the parts of the rolling mill train or for the subsequent cold working of the rolling stock. In the production of a wire rod, the defective end pieces must be cut off before the finishing roll group and before the wire rod is wound on a winding drum since it is difficult and time-consuming to shear off or detach the end piece after the wire is wound onto the drum.

Rolling mills for the production of wire rod contain highly developed system components for the economy and production capacity of the overall installation. One of the prerequisites for this is a high rolling speed. The rolling speed in the wire finishing train, in the so-called Morgan finishing group, is more than 100 m per second. When utilizing reserves, the rolling speed can amount to 120 m per second. Thus, the cropping and cutting shears, used in the rolling mill train, must be capable of cropping the rolling stock at high rolling speeds at the leading end or at the lagging end or by cutting it off for sampling or also carrying out emergency cuts during disturbances. Various shear constructions are known for this purpose.

The European Patent Application 0 256 371 A1 describes starting and continuous drum shears for high wire speeds. The drum shear for cropping rod wire is designed in such a way that it is swivelable around a vertical axis situated in the blade area and in such a way that a switch arranged upstream is adjustable for the guidance of the rod wire in synchronized transverse movement within two limiting swivel positions in which the rod wire runs outside the cut area of the shears. In this way, the blade drums can carry out several revolutions prior to the cut in order to reach the required high circumferential speeds. However, the blade drums can also rotate in continuous operation. As a result of the swiveling of the switch, e.g. the front end of a rod wire passes through the cut area of the shears so that a front cropping arrives in a deflecting channel leading to the chopper shears. The following rod wire is guided in the channel to the finishing stand or to the coiler by the continued transverse movement of the switch. The synchronized actuating drive for the swiveling of the switch comprises a crank drive combined with a cam drive, by means of which the switch can be switched smoothly and without excessive acceleration for the cut. This shear enables the cropping of the rod wire at determined points and at a determined time with high accuracy and at high rolling speeds.

Rotating cropping and sampling shears for wire rod mill trains is known from the European Patent Application 0 259 600 A1 and comprises two blade pairs arranged so as to be offset in the circumferential direction, wherein the blades with radially extending cutting edges are inserted in opposite, approximately planar blade supports supported at a uniform height below the rolling axis. The severing cuts are effected by axial displacement of a blade support in that the latter is inclined at an acute angle of a few degrees relative to the other blade support. Because of the inclined cutting position of the rotating blade, a front cropping with adjoining sample piece or a sample piece alone or a back cropping with following sample piece can be ejected laterally into a sample channel. Thus, it is possible with these shears to cut out sample pieces at desired locations of a rapidly running rolling stock and to select a continuous operation of the shears.

SUMMARY OF THE INVENTION

Proceeding from the generic shears according to the European Patent Application 0 259 600 described above, the object of the present invention is to provide another shear for cropping or sampling rapidly running rolling stock, e.g. up to 120 m per second, so that the cropping longitudinal section can be adjusted as desired, but in an exact manner, and with a predetermined cut length for a sample.

Pursuant to this object, and others which will become apparent hereafter, one aspect of the present invention relates to a blade support, which is arranged so as to be rotatable in a shear housing, is constructed as a hollow cylinder, and has a ring blade whose cutting edge rotates at the hollow-cylindrical wall of the blade support. A blade drum is provided at an axial distance from the blade support and is arranged so as to be rotatable in the same plane of rotation as the blade support. The blade drum has a ring blade arranged at the outer circumference of the drum, so that the cutting edge of the ring blade extends along the outer wall of the drum. The rolling stock is guided in a space between the blade support and the blade drum, and a displacing device for at least one of the blade support and the blade drum is also provided. As a result of the circular blade, it is, for example, possible to select the rotational position of the blades, as desired at the start of the cut. The blade support and the blade drum, as rotating bodies, can be accelerated quickly to circumferential speeds or maintained at circumferential speeds which correspond to the rolling speed of the wire or bar steel, while taking into account the required lead. Since the outer diameter of the blade drum is to be dimensioned so as to be slightly smaller than the inner diameter of the hollow-cylindrical blade support according to a construction of the invention, the blade drum can be moved into the hollow cylinder of the blade support by the displacing device. In this way, any desired length of a front or back cropping or a sample can be punched out between two points of a secant formed by the strand-shaped rolling stock and by the ring blade, which length corresponds to the length of the secant. A longer piece of the strand-shaped rolling stock can also be cropped, wherein a sample piece is additionally included in the length of the secant. In order to move the blade drum into the hollow-cylindrical blade support for quick cutting, the displacing device for the blade drum is advisably moved by a force generator which can be pretensioned with high energy, preferably by a hydraulic or pneumatic cylinder with movement damping or by means of a mechanically acting crank or toggle mechanism.

According to another embodiment of the invention, the blade support and blade drum are synchronized mechanically by means of an intermediate gear whose one pinion meshes in an external toothing cf the blade support and whose other pinion meshes with a spur wheel. The shaft of the blade drum is supported in the hub of the spur wheel so as to be fixed with respect to rotation, but axially displaceable relative to it. Accordingly, it is possible to adapt the circumferential speed of the annular cutting blades exactly to the speed of the rolling stock in every operating state, e.g. by using the speed of the rolling stock as a regulating quantity for the rate of rotation of the intermediate gear.

In a further embodiment of the invention, a removal chamber is arranged either in the shear housing or in the rotating blade support for the sample material cut out from the strand-shaped rolling stock or for the short, cut off crop ends.

Other advantageous construction possibilities for the drum punching shears are addressed below, e.g. for the connection of the shafts of the blade support and blade drum and their support and arrangement in the shear housing, as well as for an automatic opening flap for the removal chamber in the rotating blade support.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 9(a-b) show a section through the removal chamber along line IX—IX in FIG. 8 with the removal flap in a closed position a) and an opened position b); and FIGS. 10(a-b) show a force generator for the displacing device of the drum punching shears with a pneumatic cylinder and a mechanical triggering mechanism in a standby position a) and a final position b).

DETAILED DESCRIPTION OF THE PREFERRED EMBODIMENTS

Figure 1:
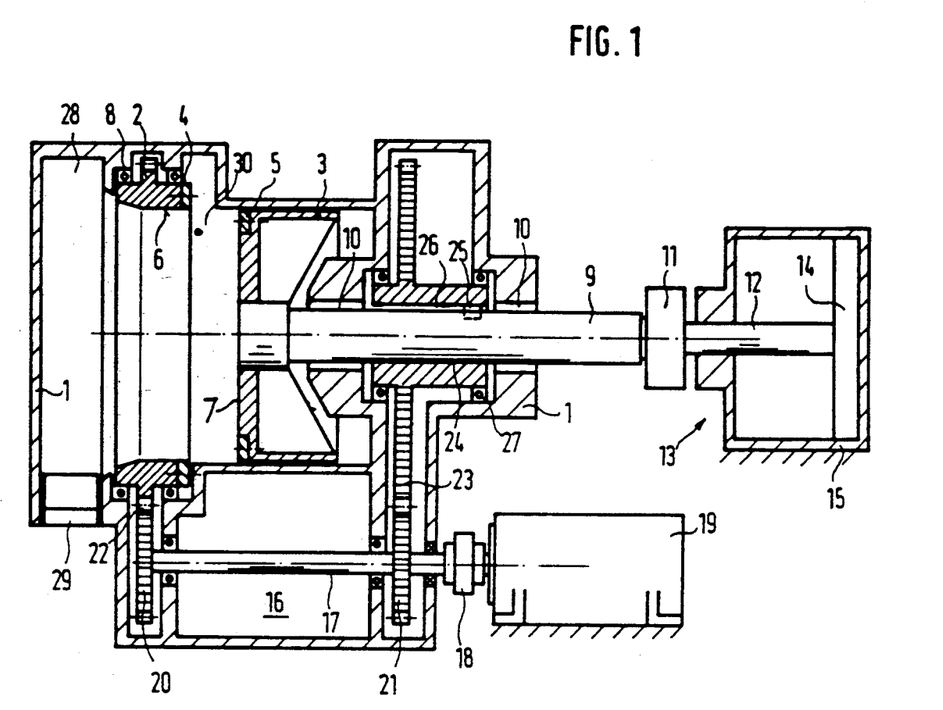
FIG. 1 is a cross-sectional view of drum punching shears pursuant to the present invention in the rest position.

FIG. 1 shows the drum punching shears for quickly running rod wire or bar steel in a schematic manner in a sectional view. A blade support 2 constructed as a hollow cylinder and a blade drum 3 are arranged in a shear housing 1 consisting of multiple parts. The blade support 2 and the blade drum 3 are equipped with ring blades 4, 5. The ring blade 4 of the blade support 2 is fastened at a front side of the blade support 2 in such a way that its cutting edge rotates at the hollow-cylindrical wall 6 of the blade support. The ring blade 5 of the blade drum 3 is likewise arranged at a front side of the blade drum 3 in its circumferential area, specifically in such a way that its cutting edge runs along the outer wall 7 of the drum. The blade support 2 is rotatable in the shear housing 1 in radial bearings 8. The blade drum 3 is rotatable in the same plane of rotation, but at a distance from the blade support 2. The rod wire 30 to be cropped can be seen in the space between the rotating ring blades 4, 5 of the blade support and blade drum. The blade drum 3 is arranged on a drum shaft 9 in an overhanging manner and the drum shaft 9 is supported in the shear housing in sliding bearings 10. The drum shaft 9 is supported in an axial bearing 11 outside the shear housing in order to absorb axial forces occurring during the actuation of the shears. The axial bearing 11 is connected with a piston rod 12 of a hydraulic force generator of a displacing device 13 whose movable hydraulic piston 14 is arranged in a known manner in a hydraulic cylinder 15 which is supported at a fixed point, e.g. the foundation. The blade drum 3 is moved in the axial direction toward the blade support 2 by the force generator of the displacing device 13. Since the outer diameter of the blade drum 3 is dimensioned so as to be slightly smaller than the inner diameter of the hollow-cylindrical blade support 2, the blade drum is movable into the hollow cylinder of the blade support for executing the separating cut of the rolling stock, e.g. for cropping the beginning of the wire.

For the purpose of synchronizing the rotation of the blade support 2 and the blade drum 3, or to synchronize the two ring blades 4, 5, the blade support 2 and blade drum 3 are mechanically connected by means of an intermediate gear 16 whose gear shaft 17 is supported in the shear housing 1 and which is driven, via a clutch 18, by a drive motor 19 arranged outside the shear housing 1. Two pinions 20, 21 are arranged on the intermediate gear shaft 17, wherein the pinion 20 meshes with an external toothing 22 of the blade support 2, and wherein the pinion 21 engages in a spur wheel 23 which turns the blade drum 3 at the same rate of rotation as the blade support 2. The drum shaft 9 is guided through the hub 24 of the spur wheel 23. A driving wedge 25 which engages in a driving groove 26 extending longitudinally or axially in the spur wheel hub 24 is fastened on the drum shaft 9 to connect the driving spur wheel 23 in such a way that it is fixed with respect to rotation, but axially displaceable, relative to the drum shaft 9. The spur wheel 23 is held in the shear housing 1 in radial bearings 27.

Further, a removal chamber 28 for the cropped rolling stock or for the sample cut out of the rolling stock strand, respectively, is provided in the shear housing 1 with a removal flap 29 constructed in the usual manner.

Figure 2:
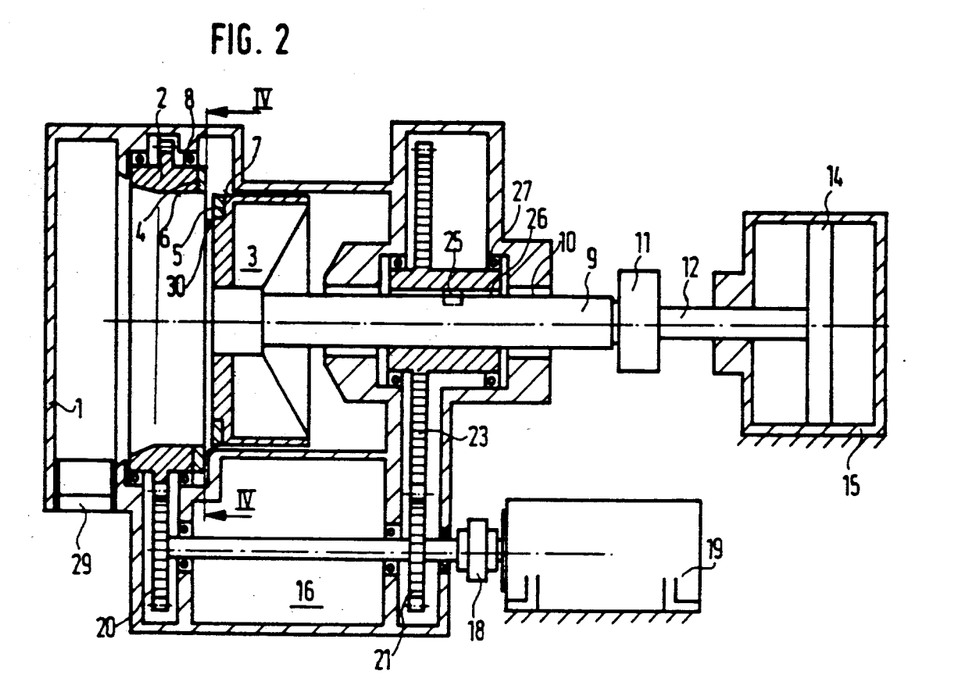
FIG. 2 is a cross-sectional view of the drum punching shears in the momentary position for the starting cut of the rolling stock.
Figure 3:
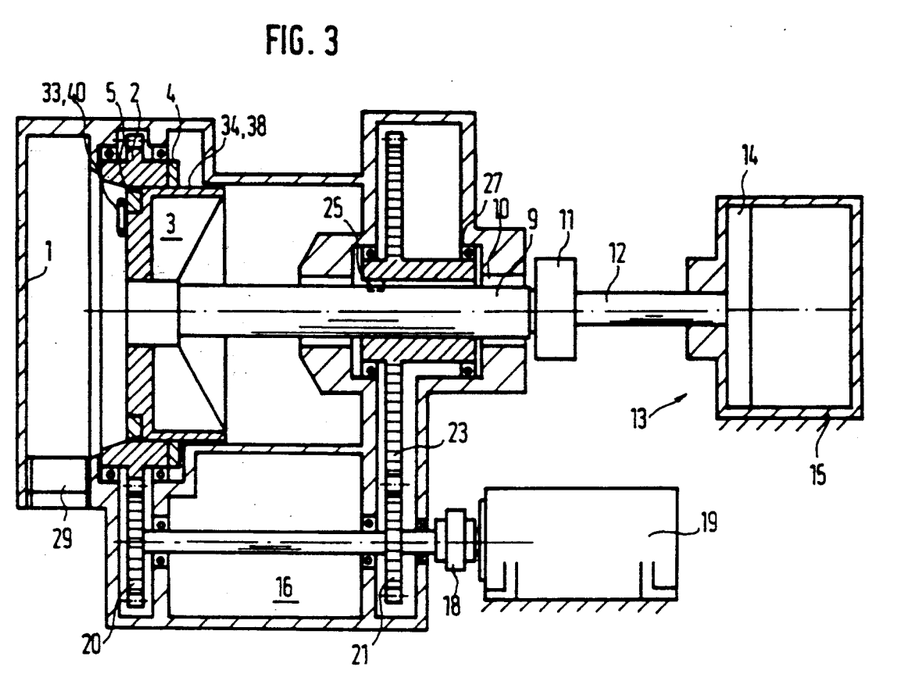
FIG. 3 is a cross-sectional view of the drum punching shears in the momentary position for the ejection of the sample.

FIG. 2 and FIG. 3 show the drum punching shears in a work position for starting the cut for the rolling stock or rod wire and in a work position for the ejection of the sample material.

It can clearly be seen in FIG. 2 that the blade drum 3 has been moved by the displacing device 13 into the rotational plane of the blade support 2, so that the ring blades 4, 5 arrive in a cutting position with reference to the rolling stock. It can also be seen that the drum shaft 9 has been moved axially in the direction of the blade support 2 through the hub 24 of the spur wheel 23 by a corresponding displacement distance, since the position of the driving wedge 25 in the driving groove 26 is changed by the same distance. It can be seen in FIG. 3 that the blade drum 3 is slid into the hollow-cylindrical part of the blade support 2 and, like the hydraulic piston of the displacing device 13, has reached the work end position. In the sample ejecting position the sample material or cropped rolling stock is thrown into the stationary removal chamber 28, which is part of the shear housing 1, due to the centrifugal force along an outwardly inclined inner wall of the hollow-cylindrical blade support and can be removed from the removal chamber 28 after opening the removal flap 29.

Figure 4:
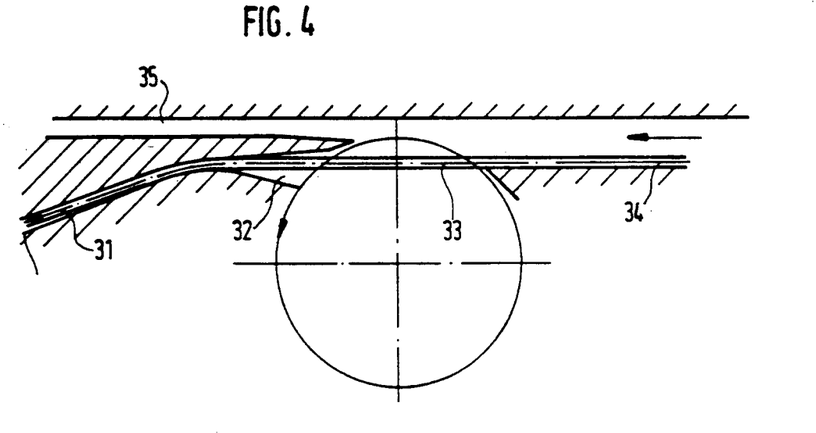
FIG. 4 is a view of the momentary position of the blade support and rolling stock at the starting cut of the front cropping.
Figure 5:
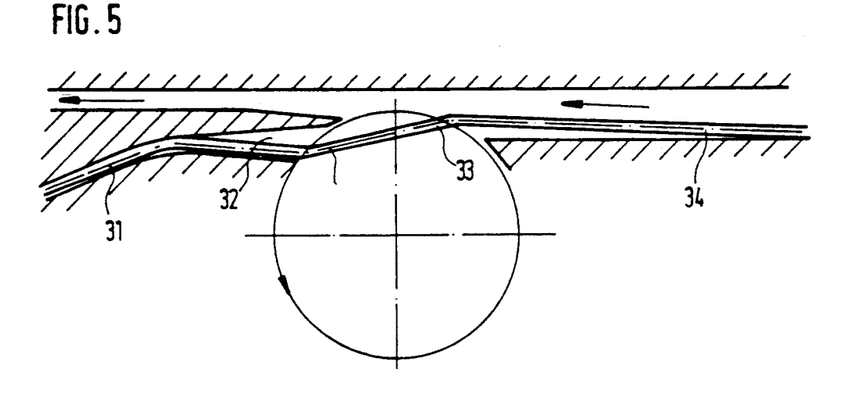
FIG. 5 is a view of the momentary position of the blade support and rolling stock at the end cut of the front cropping.

FIG. 4 and FIG. 5 show an axial side view along line IV—IV in FIG. 2, specifically at the starting cut for the front cropping (FIG. 4) and for the end cut of the front cropping (FIG. 5) of a rod wire.

It can be seen that a front cropping 31 is cut off from the rod wire by the rotating ring blades in the present operating phase according to FIG. 4, which front cropping 31 is guided into a chopper shaft 32 leading to chopper shears, not shown in more detail. Element 38 is the back cropping. Another piece of rolling stock, which can be intended for a sample, is punched out as sample material 33 along a secant drawn between the ring blades 4, 5 and arrives, as described with reference to FIG. 3, in the stationary removal chamber 28 of the shear housing 1. The cropped rod wire 34 runs up on the rotating blade drum 3 (compare FIG. 3) and is lifted by the outer wall 7 of the blade drum into the wire channel 35 guided to a coiler, not shown in more detail, and guided into in the latter. The operating situation during the punching out of the sample material 33 from the rod wire is shown in FIG. 5. The rotating ring blades 4, 5, whose circumferential speed is approximately equal to the high rod wire speed, while taking into account the required lead, lightly press the wire down in the direction of the blade rotation into the chopper shaft 32 when punching out the sample material. Thus, no adjustable switch is required so that the drum punching shears can work with great accuracy and high reliability.

Figure 6:
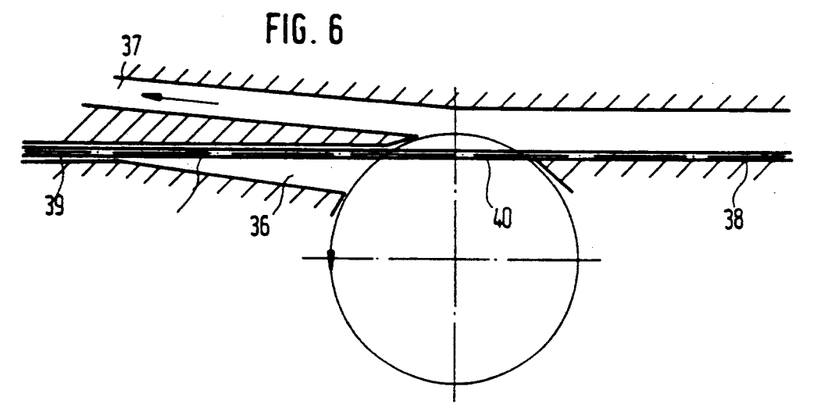
FIG. 6 is a view of the momentary position of the blade support and rolling stock at the starting cut of the back cropping.
Figure 7:
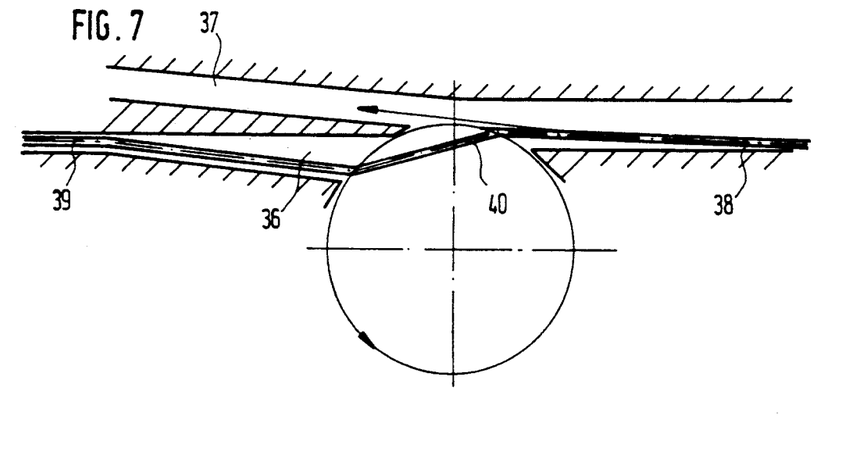
FIG. 7 is a view of the momentary position of the blade support and rolling stock at the end cut of the back cropping.

FIG. 6 and FIG. 7 likewise show the axial side view along line IV—IV in FIG. 2, but this time at the starting cut for the back cropping of the rod wire (FIG. 6) and for the end cut of the back cropping (FIG. 7).

According to FIG. 6, the rod wire runs past the ring blades 4, 5 in the shape of a secant into the wire channel 36 which leads to the coiler, not shown in more detail. The chopper shaft 37 which leads to the chopper shears, not shown in more detail, can be seen above the wire channel 36. When the rod wire end according to FIG. 7 is cropped, the cropped end runs up on the outer wall 7 of the blade drum—as shown in FIG. 3—and is lifted by this and guided into the chopper shaft 37. As a result of the rotational cut, the wire is pressed down lightly in the rotating direction of the ring blade. The sample material 40, which is punched out of the rod wire by the ring blades, is clearly shown. This sample material 40 is thrown into the removal chamber 28 of the shear housing 1 as described with reference to FIG. 3. The sample material need not always correspond to the length of the secant between the cutting points of the ring blades. Under certain circumstances, a very short cropping length may be desired to keep the material losses low in the case of highly-priced rod wires. Depending on the desired cropping length, the control command is given for the axial acceleration of the movable blade drum 3 by the force generator 14, 15. Particularly with a force generator pretensioned with high energy, e.g. by means of a pretensioned spring, very brief acceleration times can be achieved for the axial movement of the blade drum, so that the rod wire is severed only at a cutting location between the ring blades 4, 5 in spite of its very high rolling speed.

Figure 8:
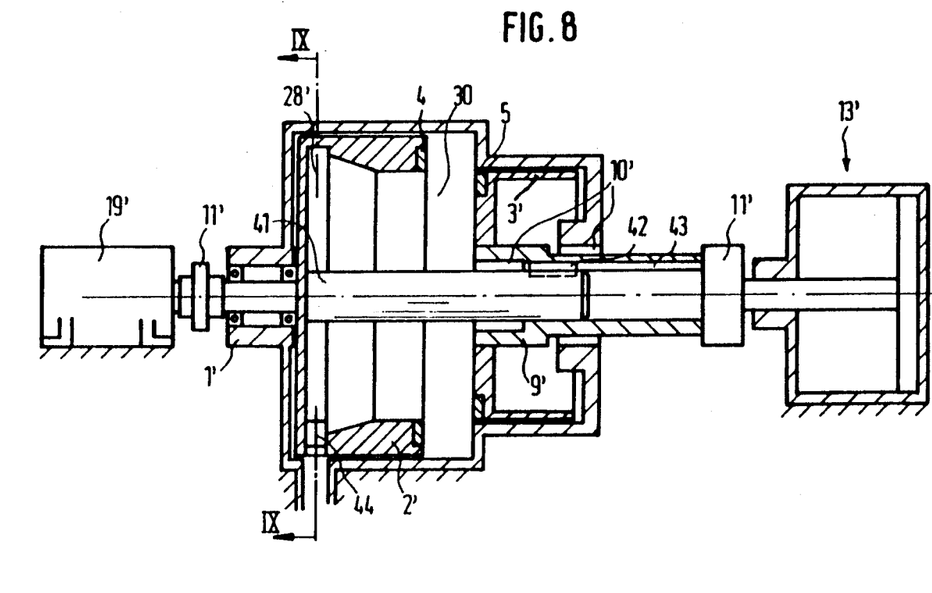
FIG. 8 is a cross-sectional view of the drum punching shears with a removal chamber for sampled material integrated in the blade support.

FIG. 8 shows a variant of the drum punching shears in which the hollow-cylindrical blade support 2' in the shear housing 1' has a support shaft 41. The support shaft 41 is inserted into a hollow drum shaft 9' on which the blade drum 3' is fastened. The hollow drum shaft 9' is connected with the support shaft 41 so as to be axially displaceable, but fixed with respect to rotation, relative to it in that a feather key 42, which engages in a feather key groove 43, is arranged at the end of the support shaft 41. The feather key groove 43 is recessed into the drum hollow shaft 9' and extends in the axial direction. The drum hollow shaft is supported in the shear housing by sliding bearings 10', and the axial support of the drum hollow shaft is effected in the axial bearing 11'. The displacement of the blade drum 3' in the blade support 2' for the purpose of the cut of the rod wire 30 is effected by means of the displacing device 13'. The drive of the blade support 2' and drum blade 3' is effected by means of a drive motor 19' arranged outside the shear housing. The synchronization of the rotation of blade support 2' and drum blade 3' is effected—as described previously—by the connection of the blade support shaft 41 and hollow drum shaft 9' by means of the feather key 42 and the feather key slot 43. The removal chamber 28' is integrated in the blade support 2'. This requires a separate construction for the removal flap 29' which is shown in FIG. 9.

Figure 9A:
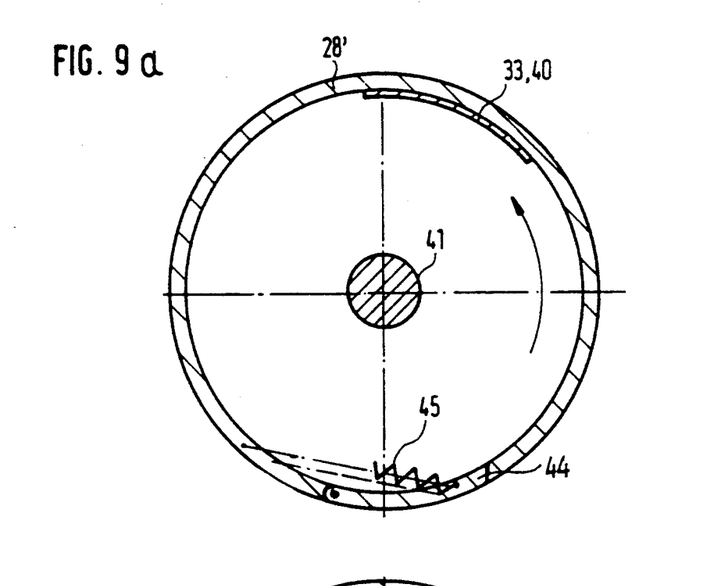
Figure 9B:
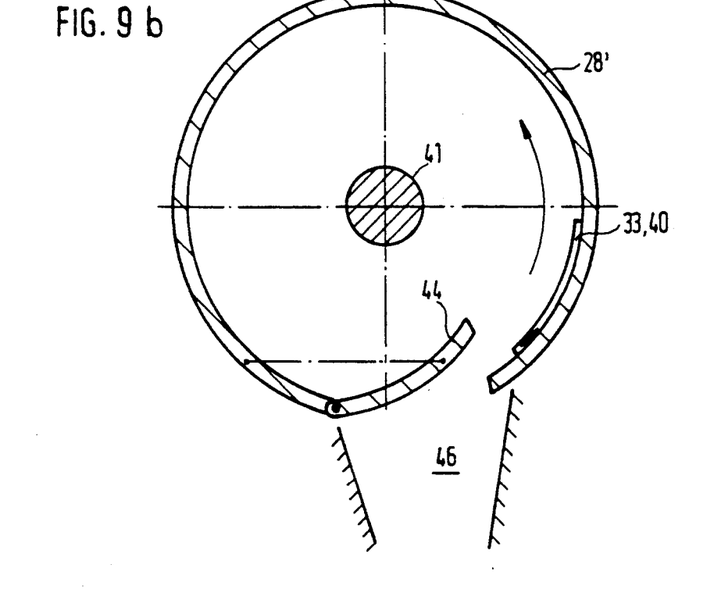

FIG. 9a shows the annular removal chamber 28' and a piece of sample material 33, 40 which has been punched out of the rod wire by the ring blades 4', 5' and contacts its wall due to the rotation of the chamber. The removal chamber has an opening flap 44, which is designed so as to be swivelable and remains closed during operation by the centrifugal force against the force of a tension spring 45, wherein the tension spring is arranged outside at the removal chamber. To remove the sample material from the rotating removal chamber 28', the speed of the drive motor 19' is reduced. The rotation of the blade support and the integrated removal chamber is likewise reduced, possibly until stationary. FIG. 9b shows that the opening flap 44 is opened by the tension spring 45 in this operating state and the sample material 33, 40 can pass into the removal shaft 46 for the sample material from the inner wall of the removal chamber 28'.

Figure 10:
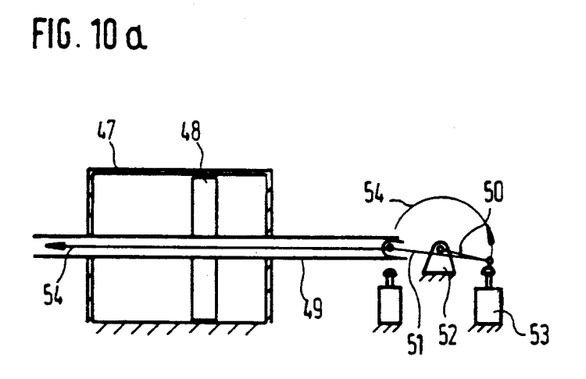

FIG. 10 shows a pretensioned force generator as a displacing device in a standby position a) and an end position b).

The standby position, according to FIG. 10a, shows a force cylinder 47 and a cylinder piston 48 with a piston rod 49, wherein the cylinder piston is pretensioned against air, against another suitable gaseous medium or against a mechanical spring. The pretensioning is effected in that a crank system acts on the end of the piston rod with a top dead center position. The crank system comprises two steering rods 50, 51, wherein the steering rod 50 is held in a bearing block 52 so as to be supported by a torsion spring. The steering rod 51 connects the other end of the steering rod 50 with the piston rod 49 in an articulated manner. In the standby position, the crank system is turned over the dead center and fixed and secured in its position e.g. by the magnet 53. If the top dead center position of the crank system is changed by the securing magnet 53 (compare FIG. 10b), then the piston 48 of the force generator which is pretensioned, e.g. against compressed air, moves in a sudden manner in the direction of the movement arrow 54 into the end position. The end position is cushioned in that the steering rod 50 strikes against a shock absorber 55. Subsequently, the crank system is turned back into the initial position, i.e. into the top dead center position (FIG. 10a), by the torsion spring arranged in the bearing block 52. As previously mentioned, the high-energy pretensioning of the force generator can be effected hydraulically, pneumatically or by a pretensioned spring. Of course, it is also conceivable to introduce an ignitable gas mixture into the cylinder space of the force generator. A motor drive via a toothed rack, a motor drive via a crank drive or a toggle lever by which the blade drum of the drum punching shears are moved very quickly toward the blade support and into the latter is also conceivable.

While the invention has been illustrated and described as embodied in drum punching shears, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A rotating cropping and sampling shears for rolling stock that rolls at high rolling speeds, comprising:
   a shear housing;
   a blade support rotatable in the shear housing and constructed as a hollow cylinder;
   a first ring blade having a cutting edge, wherein said blade is provided on the blade support so that the cutting edge rotates at a hollow-cylindrical wall of the blade support;
   a blade drum provided in the housing, at an axial distance from the blade support and arranged to be rotatable in a common rotational plane with the blade support;
   a second ring blade at an outer circumference of the blade drum so that a cutting edge of the second ring blade runs along an outer wall of the drum;
   means for guiding the rolling stock in a space between the blade support and the blade drum; and
   means for displacing one of the blade support and the blade drum.

2. The rotating cropping and sampling shears of claim 1, wherein said blade drum has an outer diameter slightly smaller than an inner diameter of the hollow-cylindrical blade support and is movable into the hollow cylindrical blade support by the displacing means.

3. The rotating cropping and sampling shears of claim 2, further comprising force generating means for generating a high energy pretension, wherein the means for displacing communicates with the force generating means.

4. The rotating cropping and sampling shears of claim 3, wherein the force generating means includes a hydraulic or pneumatic piston acting axially on a shaft of the blade drum and movement damping means.

5. The rotating cropping and sampling shears of claim 3, wherein the force generating means comprises a hydraulic or pneumatic piston acting axially on a shaft of the blade drum and a mechanically acting lever.

6. The rotating cropping and sampling shears of claim 2, wherein the hollow-cylindrical blade support in the shear housing turns in roller bearings, and the axially displaceable blade drum is supported in sliding bearings.

7. The rotating cropping and sampling shears of claim 1, further comprising means for synchronizing rotation of the blade support and the blade drum and for adjusting circumferential speed of the ring blades to approximately a rolling speed of the rolling stock.

8. The rotating cropping and sampling shears of claim 7, wherein the synchronizing means comprises an intermediate gear for mechanically synchronizing the blade support and the blade drum, wherein the intermediate gear has one pinion that meshes in an outer toothing of the blade support and another pinion that meshes with a spur wheel, the blade drum having a shaft supported in a hub of the spur wheel so as to be fixed with respect to rotation and axially displaceable relative to the spur wheel.

9. The rotating cropping and sampling shears of claim 1, further comprising a removal chamber communicating with a hollow cylinder of the blade support to collect ends cropped from the rolling stock and sample material punched out of the rolling stock.

10. The rotating cropping and sampling shears of claim 9, wherein the removal chamber is part of the shear housing.

11. The rotating cropping and sampling shears of claim 9, wherein the removal chamber is part of the rotating blade support.

12. The rotating cropping and sampling shears of claim 1, wherein the hollow-cylindrical blade support has a shaft that projects at least partially into a hollow shaft supporting the blade drum to be axially aligned, wherein the hollow shaft is connected with the blade support shaft to be rotatably fixed, yet displaceable, relative to the hollow shaft.

13. The rotating cropping and sampling shears of claim 1, wherein the guiding means guides the rolling stock along a circular edge with respect to the rotational plane of the ring blades of the blade support and the blade drum so that the rolling stock can be served at least at a cut location.

14. The rotating cropping and sampling shears of claim 1, wherein the housing has a wire channel leading to a coiler and a chopper shaft leading to chopper shears, and wherein an end cut of a front cropping or back cropping of the rolling stock is supported on the outer wall of the blade drum and is introduced by the blade drum into one of the wire channel and the chopper shaft.

15. The rotating cropping and sampling shears of claim 1, wherein the blade support has a removal chamber, and further comprising a tension-spring loaded removal flap which can be closed by centrifugal force arranged at the removal chamber.

* * * * *